Feb. 4, 1969 R. D. BOND 3,425,392
SHOCK PROTECTED NEEDLE MOUNT FOR GAUGES
Filed May 25, 1966 Sheet 1 of 2

INVENTOR.
ROBERT D. BOND
BY Morse, Altman + Oates
ATTORNEYS

United States Patent Office 3,425,392
Patented Feb. 4, 1969

3,425,392
SHOCK PROTECTED NEEDLE MOUNT FOR GAUGES
Robert D. Bond, Waltham, Mass., assignor to B. C. Ames Company, Waltham, Mass., a corporation of Massachusetts
Filed May 25, 1966, Ser. No. 552,962
U.S. Cl. 116—129                6 Claims
Int. Cl. G09f 9/00

ABSTRACT OF THE DISCLOSURE

The needle indicator for dial-type gauges is protected from shocks, overtravel and other abnormal forces by means of a coil spring operatively associated with the gauge arbor. A hub is fixed to the arbor and engages the outer end of the spring. A collar is rotatably mounted about the center of the hub and engages the inner end of the spring as well as carrying the needle indicator. A stop is provided on the hub to limit the angular movement of the needle in one direction and yet permits overtravel of the arbor without damage to the needle, the excess motion being taken up by the spring.

---

This invention relates generally to dial type gauging instruments and more particularly is directed towards a novel device for protecting gauge needles against damage from shocks, overtravel and other abnormal forces.

In dial type gauging instruments a hand or needle is mounted on a stub shaft which is angularly deflected in response to changes in a monitored condition. For example, an electrical gauge will indicate changes in voltage or current by movement of the hand, a pressure gauge will indicate fluctuations in pressure by movement of the hand and dial indicators will deflect in reaction to changes in a measured dimension. In some instruments one or more posts are provided in the path of the pointer to act at limiting stops. As long as the monitored condition remains normal, a gauge needle will vary only slightly if at all. However, if the monitored condition changes sharply or exceeds the limits of the gauge, the needle indicator will be subjected to a high torquing force and/or will be driven against a limiting post, either of which occurrences may damage the needle itself or the internal workings of the gauge.

Accordingly, it is a general object of the present invention to provide improvements in dial type gauging instruments.

It is a more specific object of this invention to provide means for protecting a gauge needle against damage from shocks, overtravel, excessive torquing forces and the like.

A further object of this invention is to provide a gauging instrument which may operate in excess of designed limits without damage to the parts.

More particularly this invention features a shock protected needle mount for dial type gauges and the like, comprising a gauge having a shaft adapted to be angularly deflected in response to changes in a monitored condition, a hub fixed to said shaft and movable therewith, a collar rotatably mounted about said shaft concentrically with said hub, a needle indicating hand fixed to said collar and a coil spring concentric with said hub and collar and connected at one end to said hub and at the other end to said collar and stop means for limiting the movement of said needle and collar with respect to said hub in one rotary direction whereby the needle may lag behind the shaft and hub under sudden movements of the shaft or may be carried in another rotary direction against a limiting post without damage even though the shaft and hub may rotate past the post position.

Figure 1:
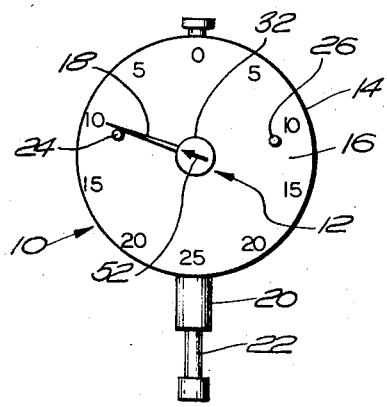
Figure 2:
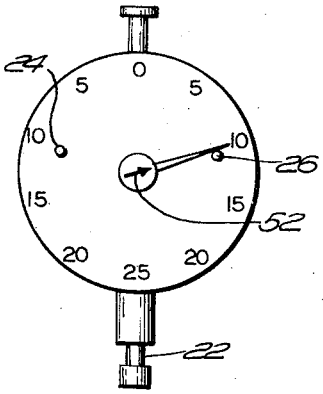
Figure 3:
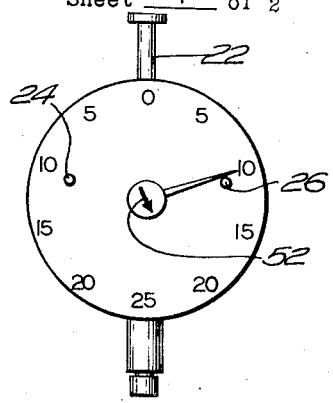
Figure 4:
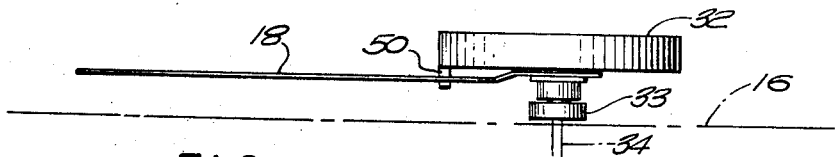
Figure 5:
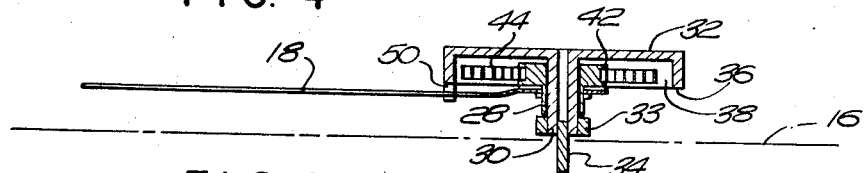
Figure 6:
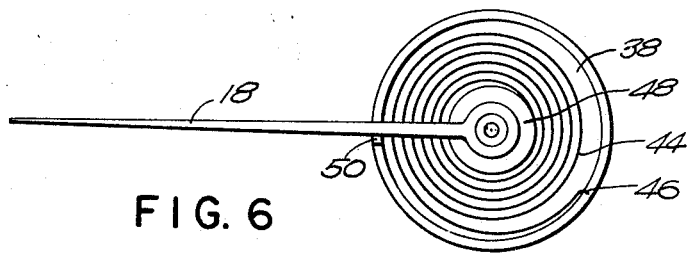
Figure 7:
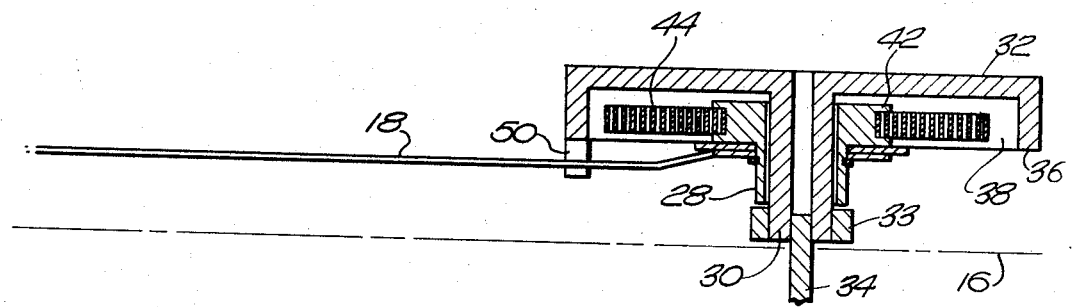

However, these and other features of the invention, along with further objects and advantages thereof, will become more readily apparent from the following detailed description of a preferred embodiment of the invention, with reference being made to the accompanying drawings, in which:

FIG. 1 is a view in front elevation of a dial indicator having a shock protected needle mount made according to the invention, and with the needle in a rest position, FIG. 2 is a view similar to FIG. 1 showing the needle hand in a normal operating position, FIG. 3 is a view similar to FIGS. 1 and 2 but showing the needle hand in an extreme position, FIG. 4 is a detailed view in side elevation showing the needle mounting device on an enlarged scale, FIG. 5 is a view similar to FIG. 4 but in cross-section, FIG. 6 is a bottom plan view of the needle mounting device made according to the invention, and FIG. 7 is a view similar to FIG. 5 on an enlarged scale.

Referring now to the drawings, there is illustrated in FIGS. 1 through 3 a dial indicator 10 utilizing a shock protected needle mount 12 made according to the invention. Typically, the dial indicator comprises a housing or casing 14 having a circular dial face 16 and a needle hand or pointer 18 adapted to be angularly deflected about the dial center in response to changes in the measured dimensions. The housing includes a tubular extension or guide 20 in which is slideably mounted a rod 22 extending diametrically through the housing. It will be understood that the rod actuates a gear train within the housing to deflect the pointer 18. In practice, the lower end of the rod is brought against the surface to be measured. If the rod 22 is moved upwardly as suggested in FIGS. 2 and 3 the needle 18 is angularly deflected in a clockwise direction.

In some instances, the dial indicator may be used as a component in a system for maintaining tolerances and to this end electrical connections 24 and 26 may be mounted to the gauge crystal at spaced points to define predetermined limits. The needle hand may be part of a control circuit and as the needle is deflected, against one or the other of the electrical connection posts 24 and 26, a signal will be generated to indicate a measurement over or under the desired range.

In any event, in the illustrated embodiment the needle is confined for movement between the two posts 24 and 26. In the event the measured dimension is normal, the needle will appear in a position midway between the two posts as suggested in FIG. 2. However, with the present invention the needle will not be damaged even though the measurement may exceed the preselected range by a large factor.

In accordance with the invention and as best shown in FIGS. 4 through 6, the needle 18 is carried by and fixed to a collar 28 rotatably mounted about a tubular neck 30 of a cup shaped hub 32 and held by a bushing 33 pressed over the end of the neck. The tubular neck of the hub is pressed over the end of a gauge arbor 34 which projects through the dial face indicated at 16 and is driven clockwise or counterclockwise by the internal gauge mechanism responding to movement of the rod 22. The hub 32 is formed with a peripheral downwardly extending skirt 36 to form a shallow, annular recess 38 facing the dial 16.

The collar 28 is formed with a peripherally grooved head portion 42 which is located within the hub recess whereby the groove faces the hub skirt 36. Mounted between the head 42 and the hub skirt 36 is a spirally wound spring 44, preferably a flat hair spring, the outer end of which is fastened to the hub at 46 and the inner end of which is fastened to the collar head at 48. An abutment 50 is provided on the hub skirt so as to restrain the needle against movement in one rotary direction only. It will thus be understood that with this construction the needle 18 as shown in FIG. 6 may be moved substantially 360° clockwise from the position shown until it reaches the abutment 50 but may not be moved at all from the position shown in a counterclockwise direction.

In any event, when the assembly is mounted to the arbor 34, it will be understood that the needle and hub will remain in the same relative positions, as evidenced by the reference mark 52 on the hub, as long as the needle is not carried against the post 26. However, should an excess measurement cause the arbor together with its hub to rotate beyond the limits of the post 26, the needle 18 will come up against the post 26 and remain there while the arbor and hub continue to be deflected angularly past that point. No damage will result to the needle insofar as the spring 44 will easily take up the excess movement. When the measurement returns to normal, the hub will deflect counterclockwise until the abutment 50 picks up the needle 18 and brings it back to a normal operating range.

It will also be appreciated that the needle will not be damaged despite repeated excess movements of the actuating mechanism and hub. The spiral spring connection between the hub and the collar provides a play of substantially 360° between the needle and the hub, although during normal operation the needle will remain in a predetermined position with respect to the hub by reason of the abutment 50.

By reversing the direction of the spiral of the spring, the needle may be protected against excess movements in a counterclockwise direction. The direction of the spiral depends upon the particular application to which the instrument is to be employed. For some instruments which fluctuate from a zero stop post to some low reading, it would be desirable to reverse the direction of the spiral in order to protect the needle from damage as it drops back against the zero post. In other cases where the needle may be subjected to violent deflection because of sharp changes in the monitored condition, it would be preferable to have the spring wound in the direction shown. In such a case the inertia of the needle under sudden acceleration will cause the needle to hang back somewhat as the hub is rotated by the drive mechanism. This lag will be only momentary insofar as the spring will quickly return the needle to its proper position with respect to the hub unless the hub is rotated past a needle limiting position. By making it possible for the needle to lag behind the hub under sudden acceleration, substantial strain is removed from the drive mechanism whenever there is sudden change in the monitored condition. The mount thus provides a shock absorbing connection between the drive mechanism and the needle. The device provides precise readings over the range of normal operation and yet neither the needle or the drive mechanism will be damaged or the operation of the instrument impaired because of an abnormal condition. The mount eliminates torque on the drive shaft normally developed by a sudden rotational movement and also eliminates strain on the needle as well as the drive train under conditions of sharp changes.

The mount may be embodied in any type of gauging instrument such as the dial indicator shown, pressure gauges, electrical meters and the like.

While the invention has been described with particular reference to the illustrated embodiment, it will be understood that numerous modifications thereto will appear to those skilled in the art. Accordingly, the above description and accompanying drawings should be taken as illustrative of the invention and not a limiting sense.

Having thus described the invention, what I claim and desire to obtain by Letters Patents of the United States is:

1. In a gauge having a pointer and an arbor adapted to be angularly deflected in response to a measured condition, an assembly for mounting said pointer to said arbor, comprising
  (a) a coil spring coaxial with said arbor,
  (b) means mounted on and concentric with said arbor connecting one end of said spring to said arbor,
  (c) a movable member supporting said pointer and disposed coaxially with respect to said arbor and freely supported thereby for relative angular movement of said pointer with respect to said arbor,
  (d) said member being connected to the other end of said spring, and,
  (e) stop means connected to said arbor and engageable with said pointer for limiting the angular movement of said movable member with respect to said arbor.

2. A device according to claim 1 wherein said means includes a hub fixed to said arbor, said hub being formed with a peripheral skirt concentric with said spring and said movable member, said skirt being disposed outwardly of said spring and connected to said one end of said spring.

3. A device according to claim 2 wherein said stop means comprises an abutment formed on said skirt.

4. A device according to claim 2 wherein said hub is formed with a central neck portion and said movable member comprises a collar rotatably mounted about said neck portion and carrying said pointer.

5. A device for mounting a pointer to a gauge arbor, comprising
  (a) a coil spring coaxial with said arbor,
  (b) a hub fixed to said arbor and connected to the outer end of said spring,
  (c) a collar carrying said pointer and freely mounted coaxially with respect to said arbor for angular movement about the arbor,
  (d) said collar being connected to the inner end of said spring, and,
  (e) stop means between said arbor and indicator for limiting in one direction the angular movement of said pointer with respect to said arbor.

6. A device according to claim 5 wherein said stop means comprises an abutment on said hub in position to engage said needle at one angular position whereby said pointer may be rotated substantially 360° with respect to said hub against said spring.

References Cited

UNITED STATES PATENTS

| | | | |
|---|---|---|---|
| 1,410,120 | 3/1922 | Radley | 200—56 |
| 1,913,194 | 6/1933 | Dietze | 200—56 |
| 1,968,866 | 8/1934 | Ames | 200—56 |
| 2,159,243 | 5/1939 | Andrews | 200—56 |
| 2,420,527 | 5/1947 | Dyson | 161—129 |
| 2,521,979 | 9/1950 | Jagen | 200—56 |
| 2,533,068 | 12/1950 | Thiele | 200—56 XR |
| 2,628,114 | 2/1953 | Paine et al. | 116—136.5 XR |
| 2,896,167 | 7/1959 | Huber | 324—155 |

FOREIGN PATENTS

| | | |
|---|---|---|
| 1,269,706 | 7/1961 | France. |
| 1,392,416 | 2/1965 | France. |

LOUIS J. CAPOZI, *Primary Examiner.*

U.S. Cl. X.R.

116—136.5